Sept. 25, 1962  W. B. CRANE  3,055,572
PAPERBOARD SHIPPING CRATE AND INTERLOCKED CRATE UNIT
Original Filed May 17, 1956  4 Sheets-Sheet 3
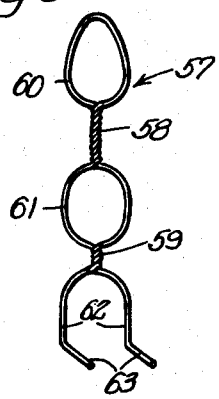
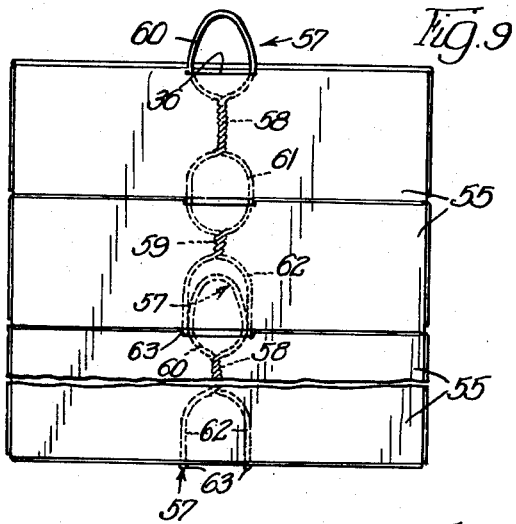
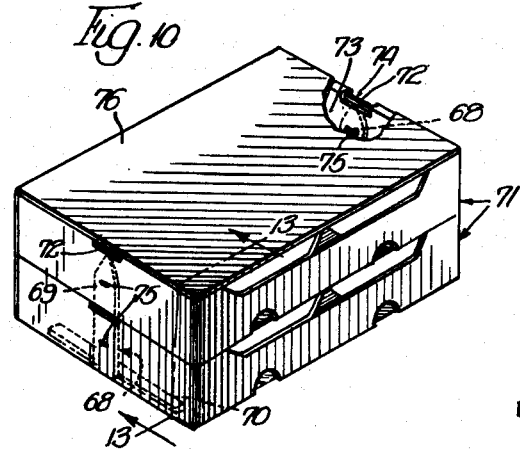
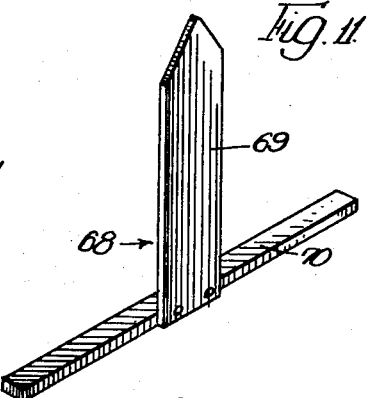
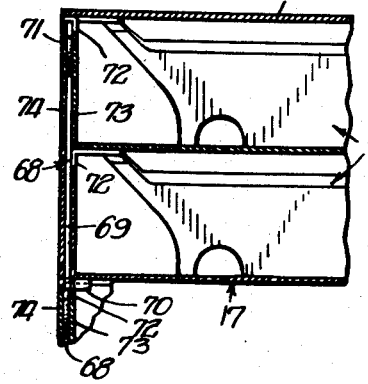
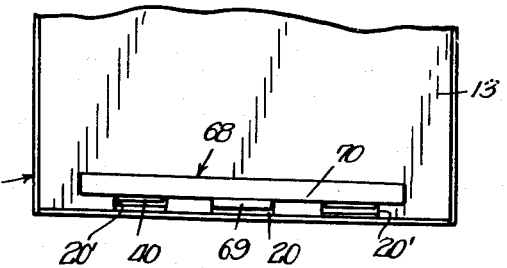
INVENTOR.
Walton B. Crane,
BY Sept. 25, 1962 W. B. CRANE 3,055,572
PAPERBOARD SHIPPING CRATE AND INTERLOCKED CRATE UNIT
Original Filed May 17, 1956 4 Sheets-Sheet 4
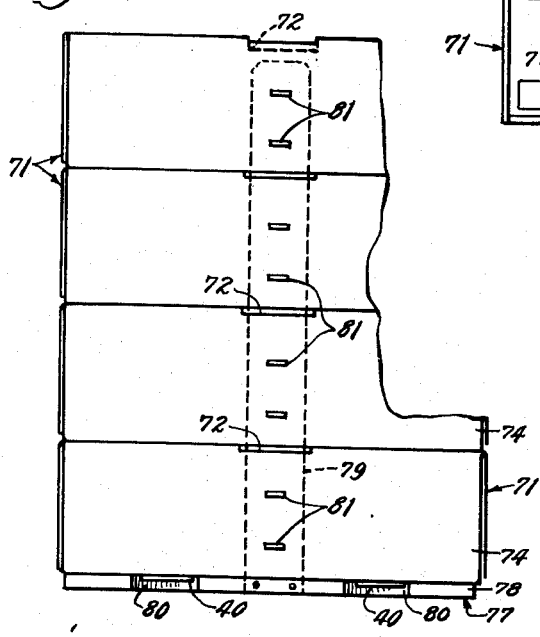
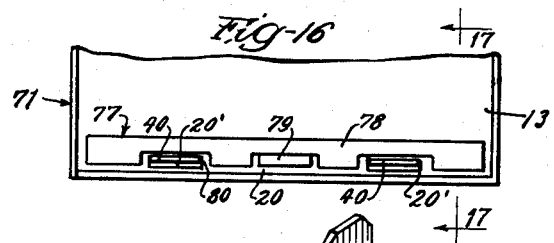
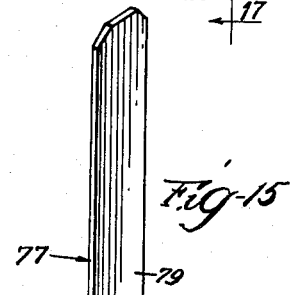
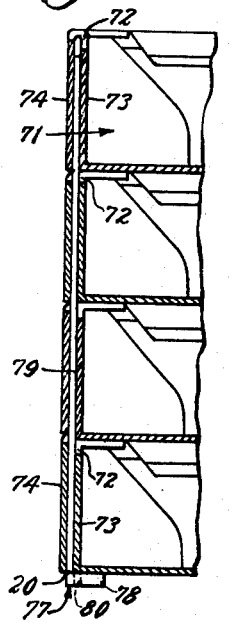
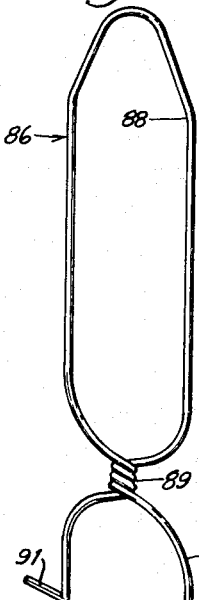
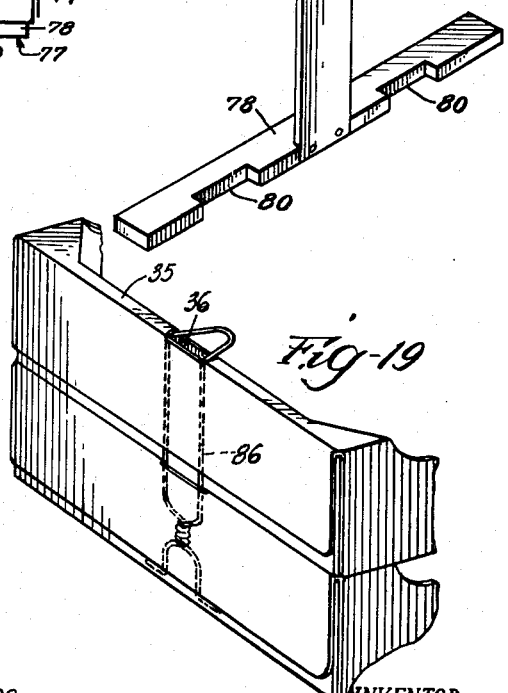

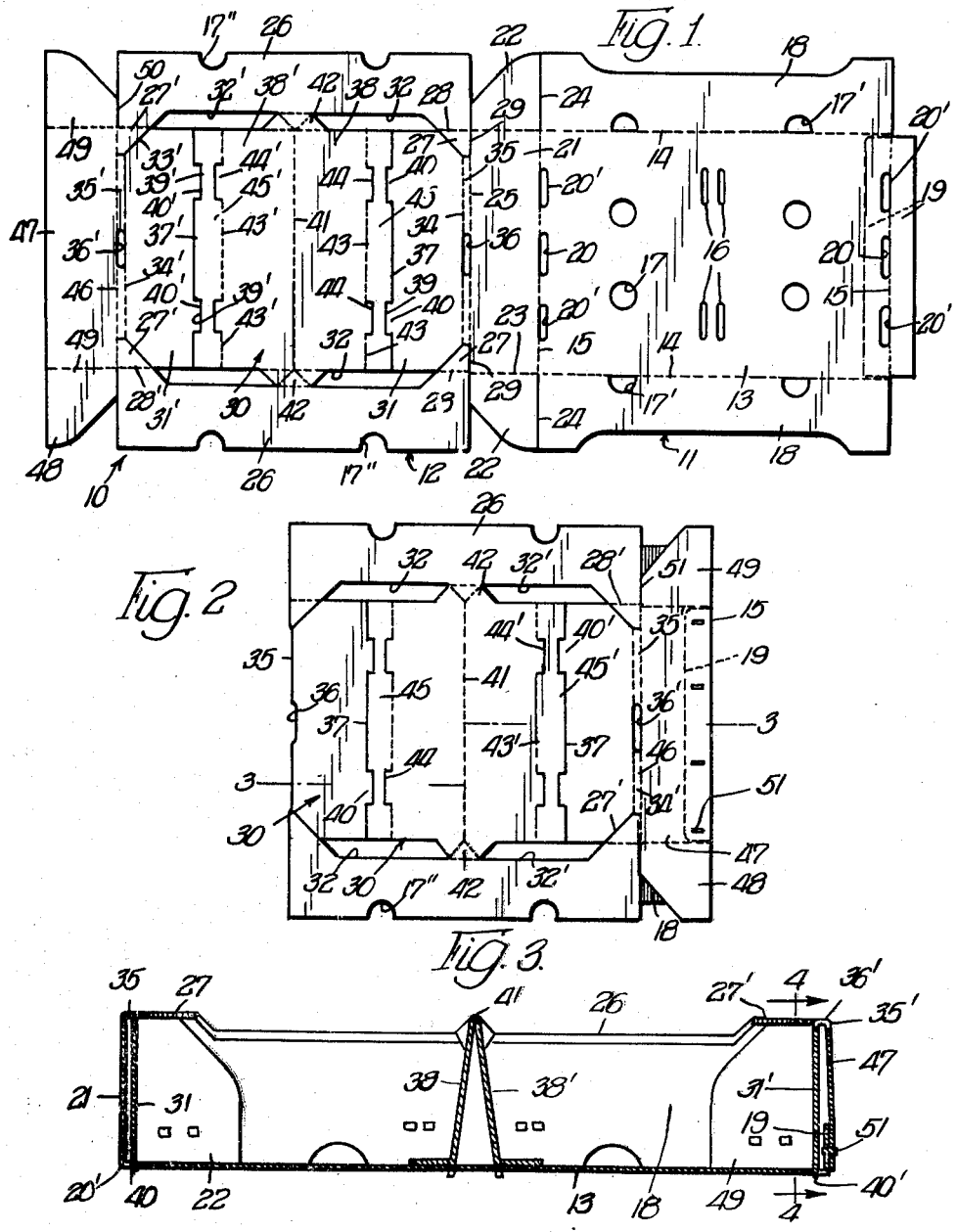

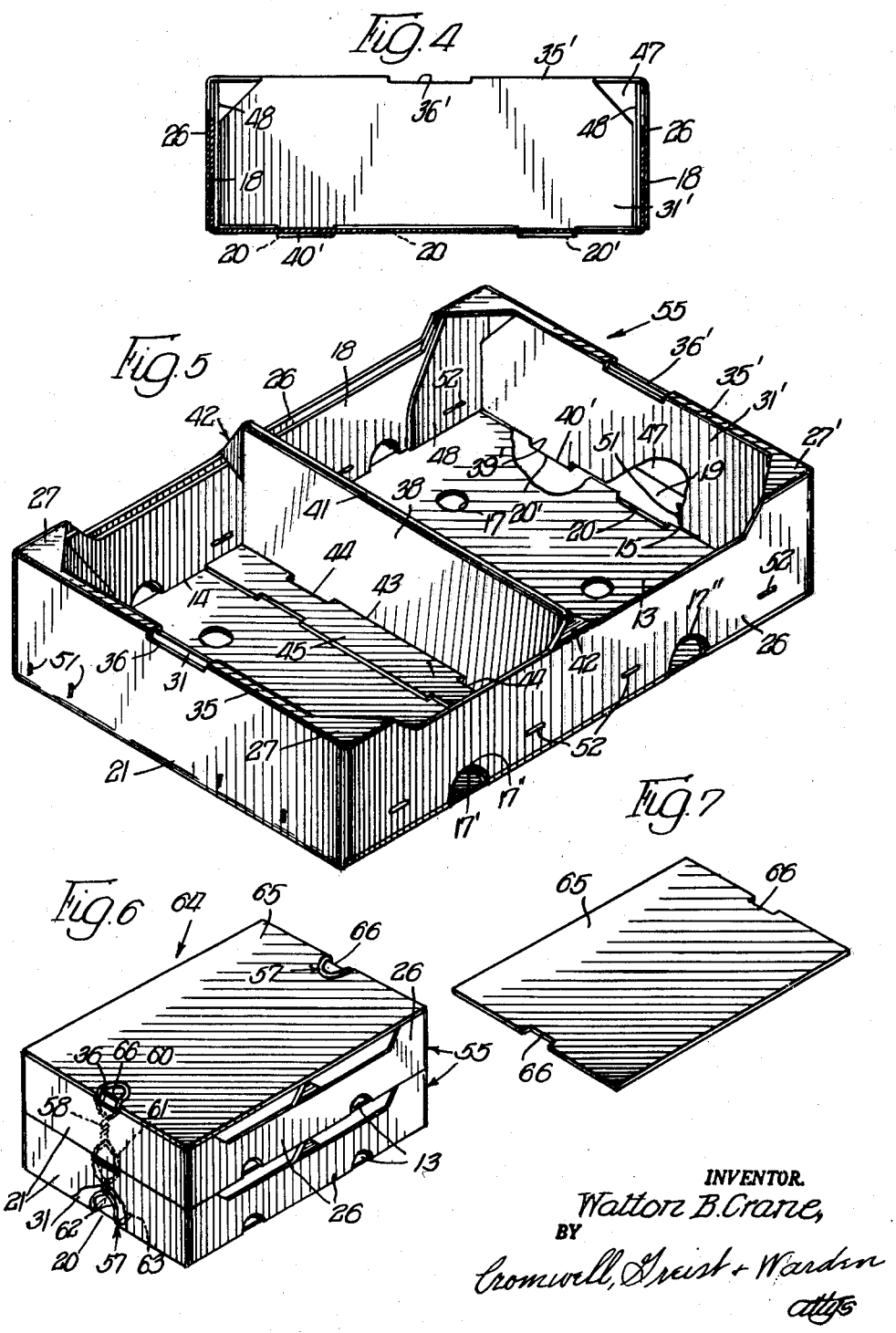

United States Patent Office 3,055,572
Patented Sept. 25, 1962

3,055,572
PAPERBOARD SHIPPING CRATE AND
INTERLOCKED CRATE UNIT
Walton B. Crane, South Pasadena, Calif., assignor to
Allied Plastics Company, Los Angeles, Calif., a corporation of California
Original application May 17, 1956, Ser. No. 585,513, now Patent No. 2,903,176, dated Sept. 8, 1959. Divided and this application July 1, 1959, Ser. No. 824,388
4 Claims. (Cl. 229—27)

The present invention relates to improvements in corrugated paperboard crates for shipping fruit, vegetables and other produce, and to different embodiments of a shipping unit composed of a plurality of the improved crates locked together in a compact and stable group by means of novel crate aligning and retaining provisions.

This application is a division of my copending application Serial No. 585,513, filed May 17, 1956, now Patent No. 2,903,176, dated September 8, 1959, which is a continuation-in-part of application Serial No. 341,075, filed March 9, 1953, now Patent No. 2,777,627, dated January 15, 1957.

It is a general object of the present invention to provide a shipping crate unit made up of a plurality of improved corrugated board crates which are interlocked in a stacked group and, so interlocked, present a light weight unit having rigidity and strength comparable to that found in a wire bound wooden crate or "lug," but which can be produced at a fraction of the cost of the latter.

Another object of the invention is to provide an improved paperboard shipping crate or container, preferably of moisture-resistant corrugated board construction, which is partially assembled and shipped to the user in a flat, knocked-down condition, the assembly of the crate being finished by the user in a simple, manually performed operation. The completed container is characterized, in one form, by a stiff, multiple thickness wall about its entire perimeter, by a unitary, seamless bottom integrally connected to its four walls, and by various reinforcing and locking provisions at those walls and at a transverse internal divider or partition which greatly strengthen and further rigidify the container.

A further object of the invention is to provide a shipping crate or container structure of the type described which is formed from a single blank cut and scored to provide integrally connected, hingedly related top, side wall and bottom wall panels, with integral end wall forming flaps extending in hinged relation therefrom and with cross partition and inner end wall reinforcing flaps cut from the top wall and folded into interlocking engagement with the bottom wall in the erected form of the crate and wherein the bottom wall forming panels are formed with interengaging locking members at their overlapping edges which, in the erected position, have edge portions positioned at opposite ends of the crate in abutting engagement with depending portions of the end wall reinforcing flaps whereby to lock the latter in erected position.

Another object is to provide a shipping unit made up of a plurality of the improved containers or crates, which are held in rigid vertically stacked and displacement resisting relation by improved and inexpensive stacking and locking members telescoped through vertically registered walls of the crates, the members being readily and quickly applied and locked to the crates and the crates being positively and securely confined by the locking members in the desired unitary assembly, so as to resist damage in shipment over long distances and under adverse weather and handling conditions.

The foregoing statements are indicative in a general way of the nature of the invention. Other and more specific objects will be apparent to those skilled in the art upon a full understanding of the construction and use of the crate and shipping unit.

In the drawings:

FIG. 1 is a top plan view of a paperboard blank employed in fabricating the improved shipping crate, in one form;

FIG. 2 is a top plan view showing the blank manipulated to form a crate in a flat, knocked-down condition;

FIG. 3 is a view in longitudinal vertical section through the crate on a line corresponding to line 3—3 of FIG. 2, this view showing the crate in erected condition;

FIG. 4 is a view in vertical transverse section along a line corresponding to line 4—4 of FIG. 3, further illustrating details and relationships of parts when the crate is further locked up;

FIG. 5 is a top perspective view illustrating the improved crate in the finally erected and locked condition of its wall and partition parts;

FIG. 6 is a top perspective view, partially broken away, illustrating a shipping unit composed of a pair of the improved crates assembled and held in a compact rigid assembly;

FIG. 7 is a perspective view of a lid or cover member which may be employed as an element of the unit of FIG. 6;

FIG. 8 is a perspective view of a crate aligning and locking device associated with the unit of FIG. 6;

FIG. 9 is a view in end elevation illustrating the manner in which more than one pair of crates may be associated as a unit in accordance with the invention;

FIG. 10 is a top perspective view, partially broken away, showing an adaptation of the invention employing a modified embodiment of aligning and locking device for a pair of stacked crates, also indicating a slight modification in the crate structure employed in this particular unit;

FIG. 11 is a perspective view of a rigid wooden aligning and locking device associated with the unit of FIG. 10;

FIG. 12 is a fragmentary bottom plan view of the unit of FIG. 10, showing the relationship of the lowermost crate thereof to the aligning and locking member;

FIG. 13 is a fragmentary view in longitudinal vertical section along a line corresponding to line 13—13 of FIG. 10, further illustrating the manner in which more than a single pair of stacked crates may be compactly assembled in a larger stack, if desired;

FIG. 14 is an end elevational view of a still further modified adaptation of the invention, generally similar to the form of FIGS. 10 to 13, but relating to the stacking and locking of four crates in a unitary group;

FIG. 15 is a perspective view illustrating a modified type of rigid wooden stacking member or device employed in the unit of FIG. 14;

FIG. 16 is a fragmentary bottom plan view of the last named unit;

FIG. 17 is a fragmentary view in longitudinal vertical section along a line corresponding to line 17—17 of FIG. 16;

FIG. 18 is a perspective view to an enlarged scale illustrating a modified form of wire stacking and locking tie or clip which may be used to hold a plurality of the crates in stacked relation; and FIG. 19 is a fragmentary top perspective view of one end of a shipping unit comprising a pair of crates held in assembled relation by the wire tie or clip of FIG. 18.

FIG. 1 of the drawings illustrates a flat paperboard blank 10, preferably of corrugated board stock suitably treated to resist moisture, which is died out in an elongated, generally rectangular outline. Blank 10, viewed as in FIG. 1, consists of the right hand wall and bottom forming section 11 and a left hand wall and partition forming section 12.

Section 11 comprises a rectangular bottom forming panel 13 outlined by opposed pairs of longitudinal and transverse creases 14, 15, respectively. Panel 13 is provided on either side of the longitudinal center line thereof with pairs of transversely spaced, transversely elongated partition latching slots 16, and it is also provided with a number of ventilating openings designated 17. Inner side wall panels 18 are integrally hinged to panel 13 by side margin forming creases 14 of the latter, and further ventilating apertures 17' are formed in wall panels 18 adjacent creases 14.

An end wall securing flap 19 of transversely elongated, rectangular shape is integrally hinged to the right hand end of bottom panel 13 by one of the creases 15, and a medial, transversely elongated crate registering slot 20 is formed in panel 13 just inwardly of that crease. Slot 20 is flanked by two similarly shaped end wall latching slots 20', similarly located with reference to crease 15. An outer end wall panel 21 of rectangular outline is similarly hinged integrally to the opposite end marginal crease 15 of panel 13, the latter also being provided adjacent this end with slots 20, 20' similar to those at the opposite end thereof. End wall sealing flaps 22, which are adapted to be disposed internally of the completed and erected container, are integrally hinged to opposite ends of panel 21 by means of longitudinal creases 23 paralleling creases 14, but located slightly inwardly thereof in the transverse sense. Transverse slits 24 separate flaps 22 from inner side wall panels 18.

Partition and wall forming section 12 is integrally hinged to end wall panel 21 of section 11 by means of a transverse crease 25. It comprises a pair of opposed outer side wall forming panels 26 integrally hinged to panel 21 by means of a pair of triangular webs 27. These are outlined by short longitudinal creases 28 almost aligned with but offset slightly inwardly of the creases 23, and by short transverse creases 29 which are, in effect, side extensions of crease 25.

The reference numeral 30 generally designates an inner end wall and partition forming panel unit made up of a set of slit-freed panel sections, as follows: At the right hand of panel unit 30, as viewed in FIG. 1, there is a generally rectangular inner end wall panel 31; this is separated from outer side wall panels 26 and from triangular webs 27 by an elongated, longitudinally extending opening 32 at each side margin of panel unit 30 and by a 45° slit 33 leading from those openings to creases 25. A transverse hinge crease 34 paralleling and closely adjacent crease 25 coacts with the latter in defining a double creased end wall hinge 35 which coincides with the top of an end wall of the completed carrier. A transversely elongated slot 36, longitudinally aligned with the centermost slots 20 of blank section 11, is provided for the purpose of receiving a stack alignment and locking member, to be described.

Inner end wall panel 31 is separated by a transversely extending shaped slit 37 from a swingable partition forming panel 38. Slit 37 includes two small, inverted U-shaped portions 39 defining transversely spaced locking feet 40 on panel 31, these feet are longitudinally aligned with the respective locking slots 20' in blank section 11.

A second set of partition and end wall forming panels, hinged by a transverse medial crease 41 to the set just described, is provided in unit 30 by slitting and creasing the same in exactly the same manner referred to above. In other words, unit 30 is symmetric in shape, and correspondingly treated, on opposite sides of crease 41. Hence corresponding parts, provisions and relationships are designed by corresponding reference numerals, primed, and further description is dispensed with. Partition forming panels 38, 38' are integrally hinged to one another by crease 41 and, moreover, are integrally connected to the respective side wall panels 26 by means of angularly creased gusset sections 42 at each end of the crease. Sections 43 form well braced struts connecting the partition formed by panels 38, 38' to the side walls when the crate is completed and erected.

Panels 38, 38' at the free swinging ends thereof adjoining the respective slits 37, 37', are provided with a series of transversely extending creases 43, 43' interrupted by U-shaped slits to define bottom locking feet 44, 44' for the respective transverse partition panels, similar to feet 40, 40' on panels 31, 31', respectively. Friction holding flaps 45, 45' lie between creases 43, 43' and the respective transverse slits 39, 39' which free the partition panels and inner end wall panels from one another.

Left hand inner end wall panel 31' of unit 30 is connected by a transverse hinge crease 46, similar to crease 25, with an outer end wall forming panel 47. End wall panel 47 has end flaps 48 integrally hinged to opposite ends thereof by short longitudinal creases 49 aligned with creases 23, and flaps 48 are separated from side wall panels 26 by transverse slits 50 aligned with crease 46.

The crate is initially fabricated in flat, knocked-down position as illustrated in FIG. 2. The bottom securing flap 19 at the right hand end of blank 10 (FIG. 1) is first folded upwardly, inwardly and downwardly about adjoining crease 51 to the position illustrated in dotted lines in FIG. 1, whereupon wall and partition forming section 12 is folded as a unit upwardly and inwardly and downwardly about double crease 35. End wall panel 47 is then secured, as by staples or stitches 51, to flap 20, leaving the container in the flat form shown in FIG. 2. It is shipped in this condition to the ultimate user.

In completing the crate to its erected condition, the flat article is expanded by a compressive force applied to its opposite end margins, represented by end wall hinges 35 and 35'. The container is thus brought to rectangular outline. Inner end wall panels 31, 31' may now be swung downwardly about their respective double creases 35, 35' into 90° relation to bottom panel 13 and the locking feet 40, 40' thereon snapped into bottom locking slots 20'. This leaves the carton in a partially erected, tubular condition illustrated in FIG. 3. Partition panels 38, 38' may next be similarly swung down about crease 41 and their locking feet 44, 44' snapped into bottom slots 16, the flaps 45, 45' trailing and wedging with bottom 13; however, it is desirable to delay this pending completion of the side wall structures of the crate.

To set up the side walls, the sets of end wall flaps 22, 48 are swung inwardly to 90° relation to end wall panels 21, 47, respectively, after which inner side wall panels 18 are swung upwardly about creases 14 to 90° relation to bottom panel 13, externally overlying flaps 22, 48. Outer side wall panels 26 are then swung downwardly 90° to side by side engagement with panels 18. With the walls and flaps manipulated as described, they are held together by staples or stitches (see FIG. 5) thereby completing the wall structure of the shipping crate, which is generally designated by the reference numeral 55. Partition panels 38, 38 are swung downwardly in opposite directions about their connecting crease 41 and engaged with bottom panel 13, as indicated above, completing the crate (FIG. 5). The flexible flaps 45, 45' on the lower end of panels 38, 38' wipe along bottom 13 as panels 38, 38' are manipulated as described, and act as friction members tending to resist inadvertent displacement of panels 38, 38' from locked position.

The set up carton presents multiple side wall and end wall thicknesses, all substantially reinforced by the lateral and vertical strut action of the center partition. A strong unseamed bottom also adds to the strength of the crate. Upwardly opening slots 36, 36' in the tops of the end walls coact with similar vertically aligned slots 20 at the ends of bottom panel 13 in locking a plurality of the crates 55 together, in a fashion illustrated in FIGS. 6, 7, 8 and 9 of the drawings.

Referring first to FIG. 8, a locking member 57, in accordance with one embodiment presented herein, consists of a single elongated length of relatively rigid wire which is first bent in U-shape and the legs successively twisted and/or welded together at 58 and 59 to stiffen the same and to provide upper and intermediate crate aligning and stabilizing loops 60, 61. The lower leg portions 62 of the wire are formed to provide a bottom bight of inverted U-shape with the terminal ends bent at 90° to the plane of the loops 60, 61 and bight 62 to afford feet 63. These are engageable beneath the bottom of a lowermost crate 55 of a two-crate stacked unit generally designated 64 in FIG. 6. Crate unit 64 may also include a relatively rigid, corrugated board top closure panel 65 of rectangular outline (FIG. 7) provided with lock accommodating recesses 66 in opposite ends thereof.

In assembling unit 64, one of the wire locking members 57 is inserted upwardly in each of the centermost slots 20 at opposite end margins of the lowermost crate bottom panel 13, the feet 63 underlying the panel. The legs of bight 62 take firm, stable engagement with the ends of slot 20 and between the inner and outer wall end wall panels, i.e., between panels 31, 47 at one end and panels 21, 31 at the opposite end. Loops 61 extend upwardly through the top end wall slots 36, 36' respectively, engaging the ends of the latter. When the second crate 55 is slipped over the upstanding members 57, half of the respective loops 61 engage in its end bottom slots 20 and the top loops 60 extend upward through its top end wall, thus registering the two stacked crates 55 in vertically aligned relation. Cover panel 65 is now applied, as illustrated in FIG. 6, and loops 60 are bent 90° inwardly and clamped against the same, completing the shipping unit 64. The latter has good longitudinal, lateral and vertical stability, with no need for further wire or other binding provisions, staples, and the like, commonly employed in assembling wooden shipping crates. Members 57 hold the crates securely in place and also function as a quickly usable cover locking device. The contents of the crate unit are well ventilated by apertures in the walls and bottom of the crate, insuring proper circulation of air therein. Units of this sort are prepared for shipment at a fraction of the cost of wooden units.

In the event it is desired to assemble a greater number of crates in a larger unit, as shown in FIG. 9, the upper loop 60 of the locking member 57 of a two crate unit is left upright, the loop 60 then entering into the space between bight legs 62 of a unit thereabove. This registers the compounded units longitudinally and laterally, in the same manner as the crates 55 of an individual crate unit 64 are registered. The uppermost crate may be closed by a cover panel similar to that illustrated in FIG. 7, clamped in place by bending over the uppermost loop 60.

A modified crate unit is illustrated in FIGS. 10–13 inclusive of the drawings; this employs a wooden crate aligning and locking member such as is shown in FIG. 11 and generally designated by the reference numeral 68. Member 68 is of inverted T-shape including a relatively wide and flat upstanding stake 69, pointed at its end, and a transverse bottom cleat 70, to the outer edge of which element 69 is centrally secured, as by nails. In employing lock member 68 it is desirable to make a slight modification in the crate, hence the latter is specially designated 71 in FIGS. 10, 12 and 13. This change simply involves an increase in depth of a side of each of the slots 72 formed at the top of the end walls of the crate, which are formed by inner and outer panels 73, 74. The slots are extended downwardly further in inner end wall panel 73, as illustrated clearly in FIGS. 10 and 13.

Locking members 68 are applied to a bottom crate 71 in the fashion shown in FIG. 12, the transverse cleats 70 being disposed inwardly to clear the inner end wall locking feet 40, 40' and the upstanding stakes 69 passing upwardly through the center slot 20 in bottom panel 13 and through the respective slots 72 of the end walls. The crate end walls are then secured to stakes 69 by staples 75. Another crate 71 is now slipped downwardly over the upper portion of the thus inserted stake, and is similarly secured thereto, whereby the two crates are properly registered in longitudinal and lateral relation by engagement of stake 69 in the various slots 20, 72.

In the event that it is desired to secure more than two crates in stacked relation, as illustrated in FIG. 13 of the drawings, the downward enlarging of slot 72 accommodates the bottom or heel portion of stake 69, at which it is secured to cleat 70, preventing interference of this heel portion with the crate immediately thereeneath. A corrugated board cover panel or lid 76 may be stapled or wire banded to the top crate of any unit.

A still further modified embodiment in a four crate shipping unit is illustrated in FIGS. 14–17 of the drawings. In this embodiment, wooden locking member 77 (FIG. 15) is also of inverted T-shaped outline, comprising a transverse cleat 78 which is centrally recessed along one edge to receive an elongated upstanding stake member 79 in flush relation to that edge. Because of this flush relation, the edge referred to is further slotted at 80 on either side of its center point to accommodate the depending locking feet 40 or 40' of the inner end wall panel of the bottom crate 71 of a stack. Stake 79 is of sufficient height to extend upwardly almost the entire height of the assembly of four crates, which are successively secured thereto by staples or stitches 81 as the stack is built up. A lid or cover may be applied, as in the form of FIGS. 10–13. Member 78 holds a stack of four crates, which is as many as are ordinarily desired in a produce shipping unit, in laterally and longitudinally correct, rigid register, as described in connection with the embodiment of FIGS. 10–13.

Another form of locking or tie clip member is illustrated in FIGS. 18 and 19 which is designated generally by the numeral 86. Tie members 86 are, like the clips 56 shown in FIG. 8, fabricated of flexible wire stock. However, in this form, they are bent to provide a single, vertically elongated upper loop 88 and a connecting welded or twisted portion 89 which joins the loop 88 to a lower leg portion 90 of inverted U-shape outline. The terminal ends of legs 90 are bent outwardly in the plane of the clip at 91 to horizontal, transversely aligned position.

The wire clips or tie members 86 are assembled with a stack of the crates as illustrated in FIG. 19. In assembling the wire tie clips 86 with the crates they are inserted upwardly through the apertures at opposite ends of the lowermost crate bottom. Each clip loop 88 passes upwardly through the space between the inner and outer end wall panels of the multiple panel end wall structure through slot 36 at the top hinge zone 35, and through the corresponding aperture and slot in a crate which is superposed thereabove. The clips 86 engage the ends and sides of the openings to preserve lateral and longitudinal register of the stacked crates, as described with reference to preceding forms and as illustrated in FIG. 19.

The upper ends of loops 88 project above the end walls of the topmost crate and may be deflected inwardly as shown in FIG. 19 to register the crates in a vertically aligned, neatly stacked unit, which is held in this unitary relationship without likelihood of relative longitudinal or lateral horizontal shifting, or vertical displacement. If desired, a cover may be applied to the topmost crates of the unit and held thereto by the inturned ends of loops 88, in the same manner as in FIG. 10 of the drawings.

I claim:
1. A tray-like container which is fabricated from a one piece paperboard blank, said blank being cut and creased to provide a series of integrally connected panels which form, when the container is erected, a top wall, a bottom wall, upstanding side walls at opposite side edges of the bottom wall, upstanding end walls at opposite end edges of the bottom wall which extend between the ends of the side walls, and a transverse partition intermediate the ends of the side walls, one of said end walls comprising an upwardly folded outer panel integrally hinged to the end of the bottom wall and a downwardly folded inner panel which is cut from the top wall and hingedly connected to the outer end wall by an integral, transverse end strip in the plane of the top wall, the other end wall comprising outer and inner panels which are hingedly connected by an integral transverse end strip in the plane of the top wall and which are folded downwardly into end wall forming relation with the inner panel being connected to the end of the bottom wall by a securing flap hinged to the latter, said side walls each comprising an upwardly folded inner panel integrally hinged to the bottom wall and a downwardly folded outer panel which is secured in face engaging relation with said inner panel and which is connected at its opposite ends to said transverse end strips by triangular web portions in the plane of the top wall, said side wall panels being connected at opposite ends to corner connecting flaps which are integrally hinged to said outer end wall panels and folded into face engaging relation with the end portions of the inner side wall panels so as to form vertically disposed reinforcing struts extending between the bottom wall and the triangular web portions in the top wall, and said transverse partition comprising a pair of panels integrally hinged to one another along a transverse hinge portion which is in the plane of the top wall, said partition panels being hinged to the outer side wall panels at the ends of said transverse hinge portion by triangular gussets which are formed in said outer side wall panels, said partition panels being folded downwardly about said transverse hinge portion, said triangular gussets being folded downwardly into overlying relation with top marginal portions of said inner side wall panels, and said partition panels having their edges secured to said bottom wall in longitudinal spaced relation so as to form a rigid cross partition of inverted V-shape.

2. A produce tray fabricated from a one piece elongate paperboard blank which is cut and creased to provide a series of integrally connected panels forming in the erected container, a top wall, a bottom wall, side walls, end walls and a transverse partition intermediate the ends of the side walls, one of said end walls comprising an outer panel integrally hinged to the ends of the top and bottom walls and an inner panel which is cut from the top wall and hingedly connected to the outer end wall by a relatively narrow, transverse end strip in the plane of the top wall, said inner end wall panel being folded downwardly in spaced relation to the outer end wall panel and having its free edge interlocked with said bottom wall panel, the other end wall comprising outer and inner panels which are integrally connected by a hinge forming transverse end strip in the plane of the top wall and which are folded downwardly into oppositely disposed, spaced end wall forming relation with the outer panel being connected to the end of the bottom wall by a securing flap hinged to the latter and with the inner panel having its free edge interlocked with said bottom wall, the outer panels of each end wall having corner flaps which are folded inwardly and secured to end portions of the side walls, the end strips connecting the panels of each end wall having elongate slots in the center thereof and the bottom wall having elongate slots vertically aligned with the slots in said end strips for accommodating a substantially rigid end wall locking member, said side walls each comprising an upwardly folded inner panel which is integrally hinged to the bottom wall and an outer panel which is integral with and folded downwardly from the top wall into face engaging relation with said outer panel and which is connected at its opposite ends to said transverse end strips by triangular web portions in the plane of the top wall which triangular web portions extend over top edges of the infolded corner flaps so that the latter form vertical corner reinforcing struts beneath said triangular web portions, and said transverse partition comprising a pair of panels integrally hinged to one another along a transverse hinge forming portion which is in the plane of the top wall, said partition panels being hinged to the outer side wall panels by triangular gussets formed in said outer side wall panels, and said partition panels being folded downwardly about said transverse hinge portion and having their transverse edges secured in longitudinal spaced relation to said bottom wall thereby to form a rigid partition of inverted V-shape.

3. A multiple crate shipping unit comprising a plurality of like rectangular paperboard crates of open-topped, tray-like construction assembled in vertically aligned, stacked relation, said crates each having a bottom, opposed side walls, and opposed end walls connected to one another, said end walls each comprising a pair of end wall panels hingedly connected in depending opposed spaced relation to a top end marginal portion along spaced hinge forming creases, said top end portion having a slot and said bottom having an end slot vertically aligned with said top slot, and vertically extending crate locking members telescoped through vertically aligned slots at the ends of said stacked crates between said end wall panels, said locking members having extending portions each comprising a rigid member of inverted T-shape having a lower transverse cleat disposed beneath the bottom of the lower crate of the stack and extending into supporting engagement beneath the end wall thereof, and an upstanding stake engaging the ends of said slots and disposed between pairs of end wall panels of said stacked crates, to which stake a panel of the end wall of each crate is fixedly secured.

4. A multiple crate shipping unit which comprises a plurality of like rectangular paperboard crates of open-topped, tray-like construction assembled in vertically aligned, stacked relation, said crates each having a bottom, opposed side walls, and opposed end walls connected to one another, said end walls each comprising a pair of end wall panels connected in vertically disposed spaced relation to a top marginal end portion along spaced hinge forming creases, said top end portion having an elongate slot in the center thereof and said bottom having an elongate slot vertically aligned with the slot in said top end portion, and a locking member of rigid material, said locking member having an inverted T-shape with a stem portion which is positioned in the vertically aligned end slots at one end of the crate assembly and secured therein by staples to the crate end walls, said locking member having a base portion in the form of a cross bar which is positioned to engage beneath an end wall of the lowermost crate in the stack thereof and to extend along said end wall a substantial distance on either side of the bottom slot so as to form a rigid support beneath the end of the crates.

References Cited in the file of this patent
UNITED STATES PATENTS

| | | |
|---|---|---|
| 1,501,314 | Dailey | July 15, 1924 |
| 2,229,355 | Watkins | Jan. 21, 1941 |
| 2,342,564 | Van Saun | Feb. 22, 1944 |
| 2,594,628 | Evans | Apr. 29, 1952 |
| 2,679,970 | Saidel | June 1, 1954 |
| 2,744,675 | Crane | May 8, 1956 |
| 2,745,590 | Herzog | May 15, 1956 |
| 2,896,835 | Burkhardt | July 28, 1959 |